(12) United States Patent
Brakefield

(10) Patent No.: US 12,481,409 B1
(45) Date of Patent: Nov. 25, 2025

(54) THREE-DIMENSIONAL COLOR SELECTION INTERFACE

(71) Applicant: Sean Brakefield, Los Angeles, CA (US)

(72) Inventor: Sean Brakefield, Los Angeles, CA (US)

(73) Assignee: Infinite Studio LLC, Los Angeles, CA (US)

( * ) Notice: Subject to any disclaimer, the term of this patent is extended or adjusted under 35 U.S.C. 154(b) by 0 days.

(21) Appl. No.: 19/067,257

(22) Filed: Feb. 28, 2025

(51) Int. Cl.
*G06F 3/04815* (2022.01)
*G06F 3/04845* (2022.01)
*G06T 15/50* (2011.01)

(52) U.S. Cl.
CPC ...... *G06F 3/04815* (2013.01); *G06F 3/04845* (2013.01); *G06T 15/50* (2013.01)

(58) Field of Classification Search
CPC .............. G06F 3/04815; G06F 3/0481; G06F 3/04845; G06F 3/0484; G06T 15/50; G06T 15/00
USPC .................................................. 715/848, 764
See application file for complete search history.

(56) References Cited

U.S. PATENT DOCUMENTS

| 10,866,721 B1* | 12/2020 | Demers | G06F 3/0482 |
| 2003/0156752 A1* | 8/2003 | Turpin | G06T 11/001 |
| | | | 382/162 |
| 2007/0229861 A1* | 10/2007 | Forbush | H04N 1/6011 |
| | | | 358/1.9 |
| 2008/0203943 A1* | 8/2008 | Baaijens | H05B 45/20 |
| | | | 315/291 |
| 2011/0167380 A1* | 7/2011 | Stallings | G06F 3/0482 |
| | | | 715/784 |
| 2012/0007879 A1* | 1/2012 | Voliter | G06F 3/04845 |
| | | | 345/594 |
| 2012/0127195 A1* | 5/2012 | Voliter | G06T 11/001 |
| | | | 345/594 |
| 2014/0267367 A1* | 9/2014 | Chong | H04N 1/60 |
| | | | 345/595 |

(Continued)

FOREIGN PATENT DOCUMENTS

| KR | 2024177338 A | * 12/2024 | G06F 3/011 |
| KR | 20240177338 A | * 12/2024 | G06T 19/006 |

OTHER PUBLICATIONS

Lyons et al., "Nine Tools for Generating Harmonious Colour Schemes", Computer Human Interaction, 6th Asia Pacific Conference, APCHI 2004, Rotorua, New Zealand, Jun. 29-Jul. 2, 2004, Proceedings, pp. 241-251 (Year: 2004).*

*Primary Examiner* — Hwei-Min Lu
(74) *Attorney, Agent, or Firm* — Dunlap Bennett & Ludwig, PLLC

(57) ABSTRACT

A color selection method includes displaying, on a display device, a three-dimensional object having an illumination highlight, wherein the three-dimensional object has a plurality of modified colors of a base color arranged along a surface of the three-dimensional object, wherein each location of said surface is associated with a modified color of the plurality of modified colors, wherein each modified color is determined based on a proximity of the associated location relative to a location of the illumination highlight, and wherein the three-dimensional object includes a selection indicator movable along the surface of the three-dimensional object for selectively defining the modified color to be selected.

10 Claims, 6 Drawing Sheets

(56) References Cited

U.S. PATENT DOCUMENTS

| | | | | |
|---|---|---|---|---|
| 2016/0370971 | A1* | 12/2016 | Hackett | G06F 3/03545 |
| 2018/0160501 | A1* | 6/2018 | Magielse | H05B 47/125 |
| 2018/0174355 | A1* | 6/2018 | Day | G09G 5/40 |
| 2018/0322661 | A1* | 11/2018 | Shugrina | G06F 3/04883 |
| 2019/0347865 | A1* | 11/2019 | Hackett | G06T 13/20 |
| 2019/0354265 | A1* | 11/2019 | Winnemoeller | G06F 3/04845 |
| 2021/0232301 | A1* | 7/2021 | Polman | H05B 47/198 |
| 2022/0335662 | A1* | 10/2022 | Echevarria Vallespi | G06T 11/001 |
| 2022/0343591 | A1* | 10/2022 | Jutan | G06T 15/50 |

\* cited by examiner

THREE-DIMENSIONAL COLOR SELECTION INTERFACE

BACKGROUND OF THE INVENTION

The present invention relates to digital image processing, and, more particularly, to providing graphical user interface control in software to facilitate a user in adding three-dimensional shadow and lighting information to a two-dimensional region of a document. The user selects the shadow and lighting information while viewing a range of color properties of a base color from a rendering of a three-dimensional surface having one or more referential light sources. The three-dimensional surface may be that of a "primitive", which includes but is not limited to orbs, planar face models, cubes, dodecahedron, and other objects that contain flat-faced surfaces.

The color editing functions used by current digital image processing applications utilize a standard color selector (such as a color wheel or an HSB color selector) designed to select a single, flat color to apply to a document. It is to be understood that herein the term "document" includes any textual computer file, including its structure and format, e.g. fonts, colors, and images, as well as standalone digital images and the like.

Under current digital image processing applications, when a user wants to simulate shadow and lighting transitions, the user is provided with a color selector that can change only a single property of color at a time. For instant, the user can change the brightness (sometime identified as luminosity) of a base color of a portion of the document to simulate shadow and lighting transitions; however, since shadow and lighting transitions often requires a change in the hue, saturation, and brightness, not just the brightness alone, of the base color, the user needs to make subsequent incremental—asynchronous—tweaks to the other color properties of the base color to arrive at a realistic shadow and lighting transition. This makes it difficult to change the base color using a standard color selector which only offers axial changes in the color space of the color selector and does not allow for changes along the transitional path between a shadow, base color, and light source.

Moreover, existing graphical color selectors and pickers typically rely on sliders to adjust parameters such as hue, saturation, and/or brightness in a linear fashion, which on its face seems to be suitable since many of these parameters are expressed as a percentage. Accordingly, current graphical color pickers are generally seen as acceptable for documents calling for two-dimensional renderings. However, the two-dimensional nature of the color picker with its imposition of linear or axial color gradient limitations of the parametrical controls neither provide a user with a context from which to select color properties to create visual cues for the shape of an object having a three-dimensional appearance nor its location with respect to light sources.

In color theory, the change of color along an illuminated surface affecting a three-dimensional appearance by way of transition of color is not generated via adjusting from white to black or vice versa, like is the case with those using the lightness slider in HSL (hue, saturation, and lightness) color space; rather, the change is between the color of a light source (highlight color) through the base color and towards the shadow color. This transition can change all three axes of HSL.

Because prior art color wheels and pickers are limited to asynchronously adjusting hue, saturation, and brightness ranges—i.e., in only a linear, or at best two-dimensional fashion, by way of sliders along a flat two-dimensional array—as a result, a user of prior art color wheels and pickers cannot easily envision how different changes in the lightness of a color effectuate different three-dimensional appearances since there is an inherent interplay and inter-relatedness between hue, saturation, lightness and the light source(s) in every preferred three dimensional appearance.

As can be seen, there is a need for a user interface in software to assist in adding shadow and lighting transitional information to a two-dimensional region of a document to give said region a three-dimensional appearance through providing a range of selectable colors along a three-dimensional surface having one or more referential light sources, wherein each selectable color embodies variations in hue, saturation, and brightness of the base color associated with shadow and lighting transitions defined by the one or more referential light sources.

SUMMARY OF THE INVENTION

The use of a rendered illuminated three-dimensional object as a color selector enables users to visualize how a base color changes in relationship to shadow regions and lighting regions along the three-dimensional object, while retaining the original base color of the object. The three-dimensional representation of the base color along a spectrum between lighter and darker colors (since shadow and highlight color are not restricted to black and white and can shift in hue and saturation as well as luminosity) tends to more closely approximate how people often intuitively think about color in the context of change depth through lightness and shading. This tends to make it easier for users, especially novice users, to understand how to create and manipulate desired colors for effectuating three-dimensionality in a two-dimensional document.

By using a rendering of an illuminated three-dimensional object to select a desired color of a base color, the user is given a context to better understand how light from one or multiple light sources affects the appearance of a three-dimensional object. The illuminated three-dimensional object provides and embodies properties of illumination including one or more highlights of one or more lights sources (including but not limited to a specular highlight), a lighted region, a shadow region, a core shadow region, and a reflected light region. These illumination properties represented along the rendered three-dimensional object provide the user strong visual cues for the shape of an object and its location with respect to light sources from a particular vantage point.

Furthermore, the user interface of the subject disclosure provides a graphical selection indicator movable along the surface of the rendered illuminated three-dimensional object, whereby the graphical indicator displays the current selectable color produced at that point of the three-dimensional object colored with the selected base color when rendered with one or more referential light sources, thereby indicating a color change of the base color towards a shadow region and a lighting region caused by the referential light sources. As a result, the color selection module of the subject disclosure consistently retains the relationship to the base color of the object. This enhances a user's ability to render three-dimensional forms in a two-dimensional space (such as a digital painting program or any image associated with a document) effectively.

In one embodiment, the three-dimensional object may be rendered as a sphere with an illumination highlight associated with a single light source. The light source may represent light coming from the top-right and having a bounce light coming in from the bottom-left to simulate light bouncing into the shadow at the bottom of the sphere off the surface which the sphere would be resting on. In other embodiments, the three-dimensional object instead could be a dodecahedron, cube, planar model of a head, etc. and include one or more illumination highlights associated with multiple light sources and at different placements/intensities. The subject disclosure could be a non-realistic, artistic rendering of a lighted three-dimensional object instead of a realistic one. The subject disclosure could render other properties that affect lighting of a three-dimensional object (such as metallic, roughness, refraction, emissive, specular, etc.). The subject disclosure could render the three-dimensional object within the systemic software itself using a three-dimensional object lighting simulation.

The subject disclosure contemplates rendering a three-dimensional object initially rendered extrinsically, outside of the software using a 3D graphics program or the like. Alternatively, the underlying extrinsic "model" be an image or other artistic rendering brought into the systemic software. The subject disclosure contemplates converting these extrinsic models to grayscale and applying a form of gradient mapping, whereby mapped colors are overlain on top of the grayscale to render the three-dimensional color selector of the subject disclosure. it is understood that the subject disclosure could encode more than just luminosity (grayscale) in the rendering of extrinsic models. For example, the subject disclosure could encode the angle of the three-dimensional surface at each pixel by encoding the luminosity in the red channel of the RGB value of the pixel, the x vector component (of the surface normal vector) in the green channel, and the y vector component (of the surface normal vector) in the blue channel. Another example could encode multiple light sources by encoding the influence of each light source at a given pixel in the rendered image into each channel of the RGB value of the pixel.

The subject disclosure contemplates using, in either the renderings of extrinsic models or intrinsic renderings through the systemic software, the rendered three-dimensional object as the color selector. In either case, a colorization process of the three-dimensional object renders the three-dimensional object with at least a base color, a highlight color, and a shadow color, as shown in the Figures and the auxiliary materials.

In the embodiments involving extrinsic models, the three colors used to colorize the rendering may be lighter grayscale values interpolated to the highlight color, mid-tone grayscale values interpolated to the base color, and darker colors interpolated to the shadow color. Although the three colors (highlight, base, and shadow) are set automatically, they may in some embodiments be changed by the user.

When entering the color selector control, the base color is set as the current user selected color being used in the document if it is not already defined. Wherein the three-dimensional object is designed to be illuminated in a realistic way, the highlight color and shadow colors may be selected artistically based on color harmony rules to create a pleasing result. One technique use, in order to avoid de-saturation when simulating a change of lighting of a color, is making the highlight color a warmer version of the base color, and the shadow color a cooler version of the base color. Accordingly, the default highlight and shadow color selections may be based on that concept by selecting colors that were analogous (a type of color harmony) to the base color. The subject disclosure could use a different logic for automatically defining the shadow and highlighting colors in relation to the base color.

In order to apply the three colors (highlight, base, and shadow) to the three-dimensional grayscale rendering of the object from an extrinsic model, an overlay blending mode function may be utilized to preserve the luminosity of the grayscale rendering while applying the shadow color to the darker regions, the base color to the mid-tone regions, and the highlight color to the lighter regions. The subject disclosure may also apply a sigmoid function to adjust the intensity of the lighting of the sphere. The sigmoid function is not necessary for the invention but allows control of the intensity of the lighting. Instead of colorizing the grayscale rendering, the software could generate the colored three-dimensional object internally using any lighting techniques to render three-dimensional objects realistically.

In one embodiment of the subject disclosure, to select a color on the lighted three-dimensional object that is a sphere, the user can either tap or drag over the colorized rendering. Internally, the software samples from the colorized rendering to determine the color the user is attempting to select. To ensure the user selected from the sphere (and not outside of it, such as the background), the sampling point from the user's interaction is restricted to the radius of the object/sphere as calculated from the sphere's center so that it only samples on the sphere and not outside of it.

If a non-sphere object were used for the rendered three-dimensional object, the outside colors of the rendering could be colored with the color at the closest point on the three-dimensional object determined using a distance function. Then the sampling can occur anywhere on the rendered image.

The color selector control may display a circular selection indicator of the current position being sampled from on the lighted sphere (the current color indicator) so that the user can visualize where they are selecting in relation to the lighting conditions of the sphere. The selection indicator could be a non-circular shape for the current color indicator.

To enforce the perception of depth and picking from a three-dimensional object, a transformation may be applied to the current color indicator so that it appears to move on top of the surface of the sphere through, for instance, by rotating the indicator so that its minor axis points towards the center of the sphere. Then the scale of the circular indicator (creating an elliptical shape) is based on the radius from the center of the sphere where less scaling is applied when approaching the center of the sphere and more scaling is applied as the indicator approaches the edge of the sphere.

If a non-sphere object were used for the rendered three-dimensional object, the x and y component vectors of the surface normal vector of the three-dimensional object could be calculated algorithmically or embedded in the pixel data of the three-dimensional rendering (as mentioned above when describing the conversion of the three-dimensional object into grayscale). The angle of rotation and scaling for the indicator can then be calculated from the x and y component vectors to transform the indicator so that it appears to travel along the three-dimensional surface of the object.

Even though the user is changing the current color being used for editing of the document using the color selector control, it is expected that the base color and current lighting setup are preserved when leaving the color selector control unless the user changes the current color being used to edit the document to a color that cannot be selected from the current setup of the color selector control (such as picking a different color from the document or from a separate color selector).

After selecting the color from the color selector control, the user can then leave the control and apply the selected color to the document. Currently, the RGB value of the color is embedded in the document, though in some embodiments the RGB value could embed some other information that relates to the current lighting setup of the color selector control such as a tag to retrieve a stored version of the current colorized three-dimensional rendering and the x and y locations to sample the color from that stored rendering.

In one aspect of the subject disclosure, a color selection method includes displaying, on a display device, a three-dimensional object having an illumination highlight, wherein the three-dimensional object has a plurality of modified colors of a base color arranged along a surface of the three-dimensional object, wherein each location of said surface is associated with a modified color of the plurality of modified colors, wherein each modified color is determined based on a proximity of the associated location relative to a location of the illumination highlight, and wherein the three-dimensional object includes a selection indicator movable along the surface of the three-dimensional object for selectively defining the modified color to be selected.

In yet another aspect of the subject disclosure, a color selection method for a document includes the following: rendering, on a display device, a three-dimensional object having a surface that includes an illumination highlight, an associated shadow region, and a plurality of selectable colors of a base color arranged along the surface; mapping the selectable colors along the surface involves defining each selectable color based on the proximity between the color's location on the surface and the illumination highlight; and rendering a selection indicator movable along the surface of the three-dimensional object, wherein the position of the selection indicator defines a modified base color corresponding to a selected color variation; and applying the modified base color to the document.

These and other features, aspects and advantages of the present invention will become better understood with reference to the following drawings, description and claims.

BRIEF DESCRIPTION OF THE DRAWINGS

FIG. 1 is a schematic view of an exemplary user interface 100 that can be used to make a color selection in accordance with an embodiment of the subject disclosure. Where a bracket 5 is provided to indicate the range of a plurality of selectable colors a user can select from.

DETAILED DESCRIPTION OF THE INVENTION

Figure 1:
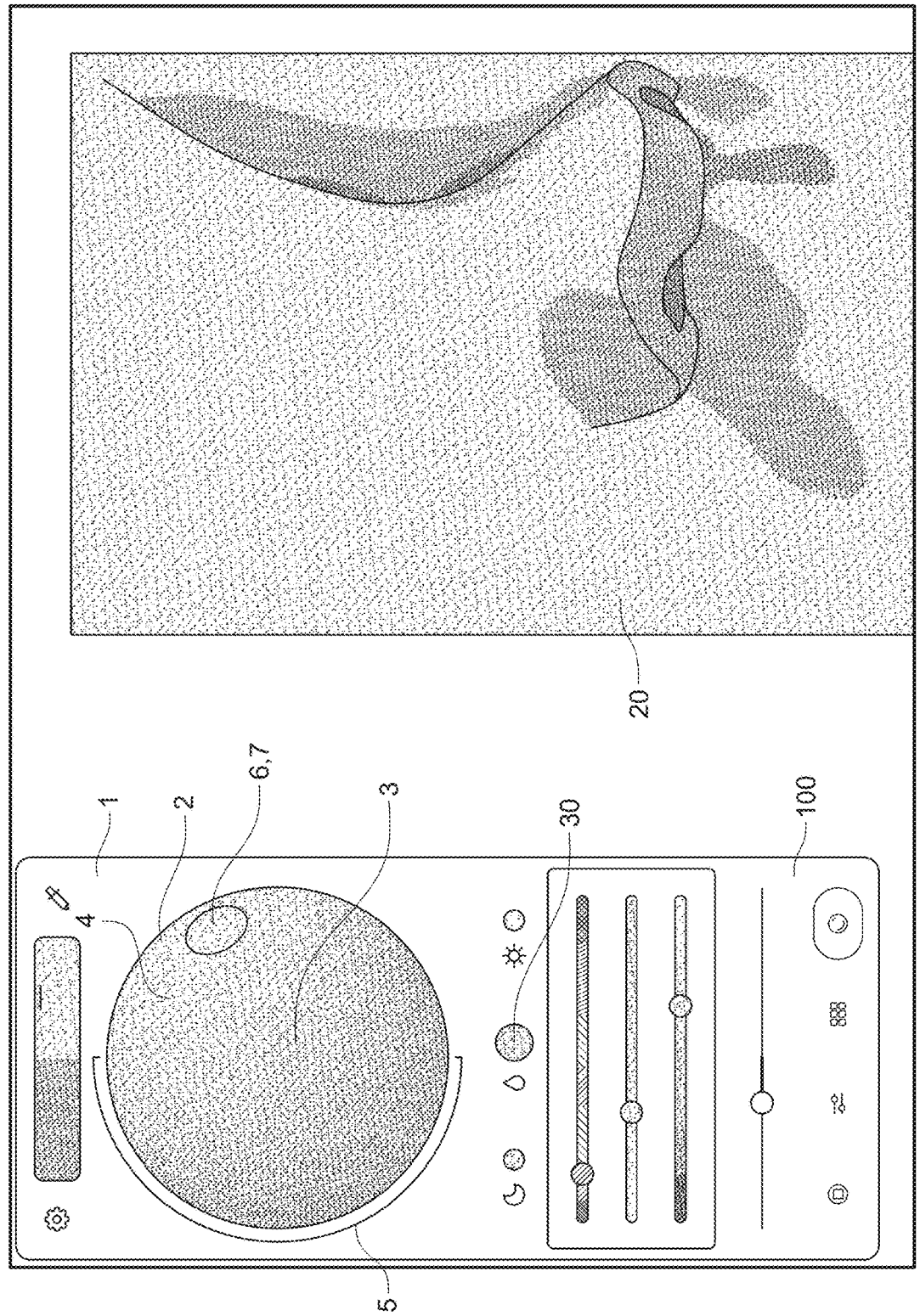

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides techniques for facilitating the selection of a color using a computer-based user interface, whereby the user interface provides a color selector in the form of a rendering of an illuminated three-dimensional object displaying a full array of illuminated properties of a base color ranging from a shadow color (0%) to a highlight color (100%) defined relative to light attributes along a surface of the three-dimensional object, thereby allowing the user to easily appreciate the relative luminosity of a color selected in the context of three-dimensional objects having a light attribute corresponding to a selectable light source. The rendered illuminated three-dimensional object may represent illumination properties associated with multiple light sources.

As used herein, "color" is a characteristic of light that can be parametrically defined according to a variety of different models. For example, a RGB color model can be used to define a color based on three values (r, g, b) that correspond to the relative contributions of red, green and blue light, respectively, that can be used to form the color. The RGB color model is useful for the sensing, representation and display of color in electronic systems, but the (r, g, b) values are often non-intuitive in terms of establishing meaningful relationships between colors. For example, a dark brown color can be represented by the (r, g, b) values (44, 29, 7), while a similar but lighter cream color can be represented by the (r, g, b) values (221, 207, 187). Thus, it is unclear whether these two colors are darker and lighter shades of each other from their respective (r, g, b) parameters. Therefore, other color models which provide more meaningful relationships between colors are often used in the context of color selection. These color models rely on parameters such as hue, brightness, saturation and luminosity.

As used herein, "luminosity" refers, in addition to its ordinary meaning, to a measure of where a color falls on a spectrum between black and white, and thus luminosity can be thought of as a measure of how close a given color is to black or white. Luminosity is also typically expressed in terms of a percentage, where a luminosity of 0% corresponds to black and a luminosity of 100% corresponds to white. Accordingly, a color of a given hue and saturation having a luminosity of 50% will appear as close as possible to the pure color of that hue and saturation, as compared to colors having a higher (faded) or lower (darkened) luminosity. Thus, luminosity is a unique parameter as compared to brightness and saturation in that the midpoint of the luminosity scale corresponds to pure hue. Luminosity is also sometimes referred to as "lightness".

It being understood that the spectrum of colors along the rendered three-dimensional object are not restricted by the change in "luminosity" as defined by the HSL color model. One model embodied in the subject disclosure renders the 3D object using a colored light source and defines a shadow color. This means that the highlight and shadow colors can shift hue and saturation as well. For example, a blue sphere may have a creamy, warm highlight and a dark purple for the shadow. This may look more natural and vibrant than purely shifting from white to black in the light and shadow regions (which would desaturate the blue).

In one embodiment, the user interface includes a rendering of an illuminated three-dimensional object (hereafter, "I3DO") 2 and operatively associated selectable color indicator 7. The I3DO 2 provides a three-dimensional surface (which may be curved, flat or angular) of a selected base color with varying degrees of luminosity of said base color displayed with respect to an arc distance from highlight 4 of the I3DO 2. The selectable color indicator 7 also displays a modified base color corresponding to said arc distance. The selectable color indicator 7 can be a combination control and display element that incrementally modifies the luminosity of the base color it displays.

This embodiment allows users to select a color based on an intuitive concept of luminosity in context of a three-dimensional having an identifiable light attribute, wherein the three-dimensional object simultaneously displays a range of luminosity corresponding to said identifiable light attribute.

The various embodiments disclosed herein can be implemented in various forms of hardware, software, firmware and/or special purpose processors. For example, in one embodiment a non-transient computer readable medium has instructions encoded thereon that, when executed by one or more processors, cause one or more of the color selection methodologies disclosed herein to be implemented. Such a computer-readable medium can be provided in the form of a computer software application or applet that is tangibly embodied on a memory device, and that can be executed by a computer having any suitable architecture. In certain embodiments the computer software application is specifically designed for the manipulation of artwork such as digital images and graphics, although in other embodiments the functionalities disclosed herein can be incorporated into other software applications, such as video editing applications, desktop publishing applications, or other content generation and modification applications. The computer software application may include a number of different modules, sub-modules or other components of distinct functionality that can provide information to, or receive information from, other components. These modules can be used, for example, to communicate with input and output devices such as pointing devices, display screens, touchscreens and/or other user interface devices. For instance, certain embodiments include an application user interface that includes a color picker comprising a color picker module configured to display a three-dimensional surface, a user interface indicator module configured to display one or more graphical indicators usable to adjust the position along the three-dimensional surface, and a sample light source module configured to selectively display one or more light attributes along the three-dimensional surface.

A computer system may be used to run the hardware, software, firmware, special purpose processors and/or modules. The computer system may include one or more devices selected from a desktop or laptop computer, a workstation, a tablet, a smartphone, a set-top box or any other such computing device. A combination of different devices may be used in certain embodiments. The computer system may include, among other things, a processor, a memory, an operating system, an application user interface and a communications module. A bus and/or interconnect may also be provided to allow for intra-device communications using, for example, the communications module. The computer system is optionally coupled to a network to allow for communications with other computing devices, such as a server. Other componentry and functionality will be apparent considering this disclosure, and it will be appreciated that the claimed invention is not intended to be limited to any particular hardware configuration.

The processor can be any suitable processor, and may include one or more coprocessors or controllers, such as a graphics processor, to assist in control of the computer system. The memory can be implanted using any suitable type of digital storage, such as one or more of a disk drive, a universal serial bus (USB) drive, flash memory and/or random-access memory (RAM). The operating system can be implemented with any suitable operating system, but some exemplary embodiments are implemented with Google Android, Linux, Microsoft Windows, or Apple OS. As would be appreciated considering this disclosure, the techniques provided herein can be implemented on any such platform. The communications module can be any suitable network chip or chip set which allows for wired and/or wireless connection to a network so that the computer system can communicate with other local and/or remote computing systems and/or servers. The network may be a local area network (such as a home-based or office network), a wide area network (such as the Internet) or a combination of such networks, whether public, private or both. In some cases, access to computing resources on a given network may require credentials such as usernames, passwords and/or any other suitable security mechanisms. Other embodiments of computer systems may not be coupled to any network and may just operate as a stand-alone computing system.

The application user interface is configured to provide information to, and to receive information and commands from, a user. It can be implemented with or otherwise used in conjunction with a variety of suitable input/output hardware devices that are coupled to or that otherwise form a part of the computer system. Examples of such input/output hardware devices include display, a textual input device such as keyboard and a pointer-based input device such as mouse. Other input/output devices that may be used in other embodiments include a touchscreen, and/or a touchpad. In certain embodiments the application user interface is installed local to the computer system. Alternatively, the computer system can be implemented in a client-server arrangement wherein at least some portions of the application user interface are provided to the client computing system using an applet, such as a JavaScript applet, or other downloadable module. Such a remotely accessible module can be provisioned in real-time in response to a request from the client computing system for access to a given server having resources that are of interest to the user of the client computing system. For example, a user of a tablet computer may invoke the application user interface upon accessing a cloud-based repository of images and/or other content that the user wishes to edit. In such embodiments the server can be local to the network or remotely coupled to the network by one or more other networks and/or communication channels. In any such stand-alone or networked computing scenarios, the application user interface may be implemented with any suitable interface technologies that allow a user to interact with the computing system.

In certain embodiments the application user interface 100 includes a color picker that is configured to provide the various color selection techniques disclosed herein, thereby facilitating the process of selecting a color for use with any variety of computer-based applications. Examples of such applications include image editing software applications, web content generation applications, desktop publishing applications, word processing applications, presentation applications, digital video processing applications and electronic mail applications. To this end, note that the application user interface may be included in each such application, or used in conjunction with such an application. Likewise, in other embodiments the color picker itself may be integrated into the given application rather than the entire user interface being so integrated. In still other embodiments, the color picker may be implemented as a distinct executable application that works in conjunction with the user interface and/or target application. The color picker can also be used to make a color selection in conjunction with an operating system or a configuration settings manager associated with the computer system. More generally, it will be appreciated that modern computer systems and computer applications often allow users to select colors for a wide variety of purposes, not only for content generation but also for screen appearance customization, and that a color picker such as disclosed herein can be used for such purposes. The functionality of color picker can be implemented using, for example, modules including a display module. Other modules may additionally or alternatively be included in other embodiments. For example, in other embodiments the color selection techniques may be implemented in one or more dedicated modules with which the application user interface interacts. These various color selection techniques and modules will be discussed in turn.

As will be further appreciated in light of this disclosure, the various components and modules of the disclosed system, such as the color picker and/or by the application user interface, can be implemented in software, such as a set of instructions encoded on a suitable computer readable medium, that when executed by one or more processors, cause the various methodologies provided herein to be carried out. The instructions can be encoded using suitable programming language, such as C, C++, object-oriented C, Java, JavaScript, or Objective-C, or alternatively, using custom or proprietary instruction sets. The computer-readable medium may be a non-transitory storage medium suitable for storing digital information, such as a hard drive, a server, flash memory and/or random-access memory. In alternative embodiments, the components and/or modules can be implemented with hardware, including gate level logic such as a field-programmable gate array (FGPA), or alternatively, a purpose-built semiconductor such as an application-specific integrated circuit (ASIC). Still other embodiments may be implemented with a microcontroller having several input/output ports for receiving and outputting data, and several embedded routines for carrying out the functionality described herein. It will be apparent that any suitable combination of hardware, software and firmware can be used.

FIGS. 1 through 6 illustrate an example user interface 100 that can be used to make a color selection in accordance with an embodiment of the present invention. As illustrated in FIG. 1, the application user interface can be configured to cause the user interface 100 to appear on a display that is coupled to, or that otherwise forms part of, the computer system. The user interface can be displayed, e.g., within a panel 1, in response to a user command associated with color selection, such as a command to adjust the appearance of a digital image or the like. The user interface 100 may include the orb 2 generated by the color selection module, one or more light sources attributes, such as but not limited to one or more highlights 4, generated by the light source module, a graphical indicator generated by the indicator module, and other fields generated by a color display module. Other user interface elements can be used in other embodiments, as will be discussed in turn. It will also be appreciated that the arrangement, orientation and appearance of the various user interface elements illustrated in the Figures is provided for purposes of illustration only, and that the present invention is not intended to be limited to any such arrangement, orientation or appearance.

Figure 2:
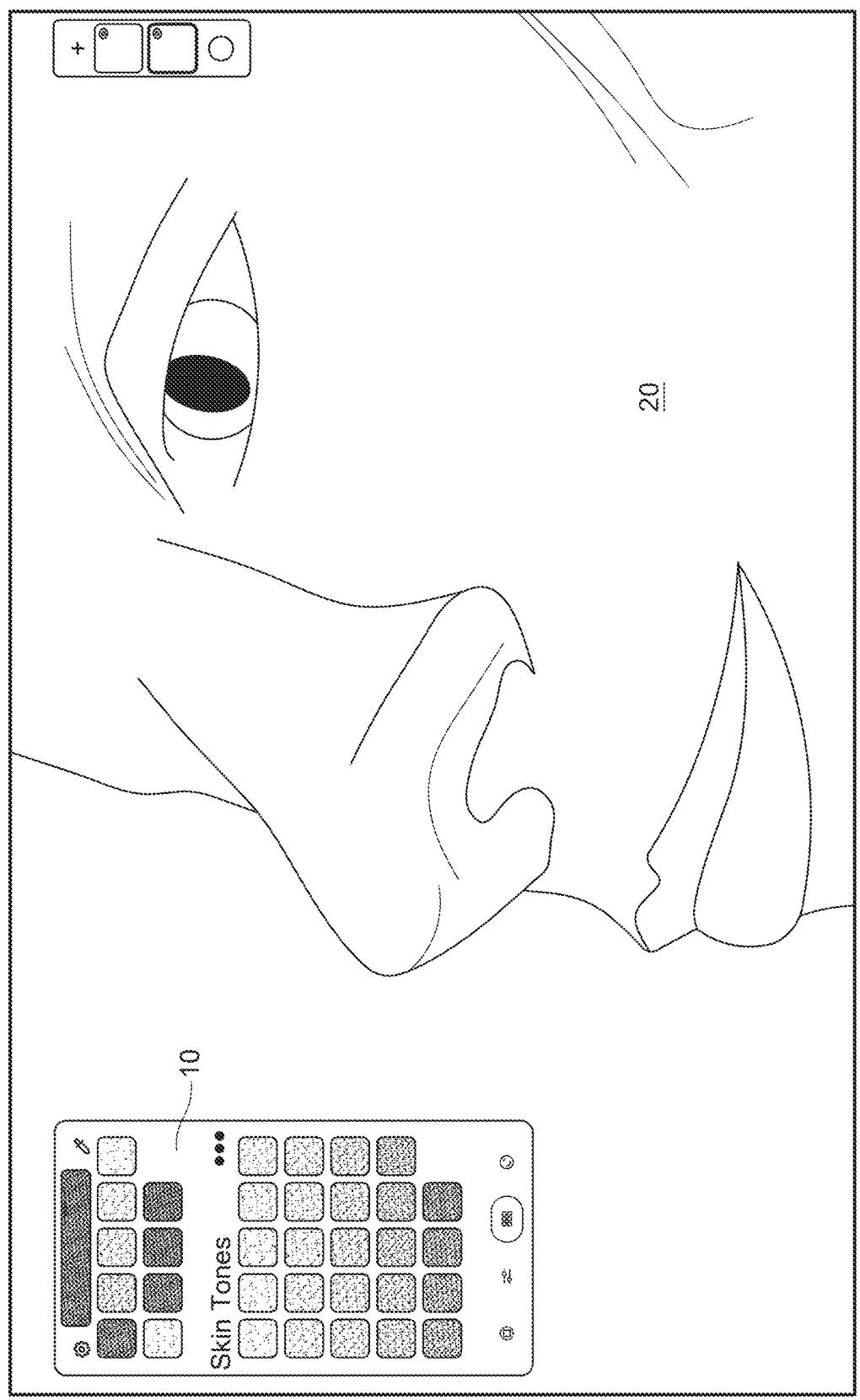
FIG. 2 is a schematic view of an exemplary embodiment of the subject disclosure, illustrating a base color picker 10 for selecting a base color to be applied to a document.
Figure 3:
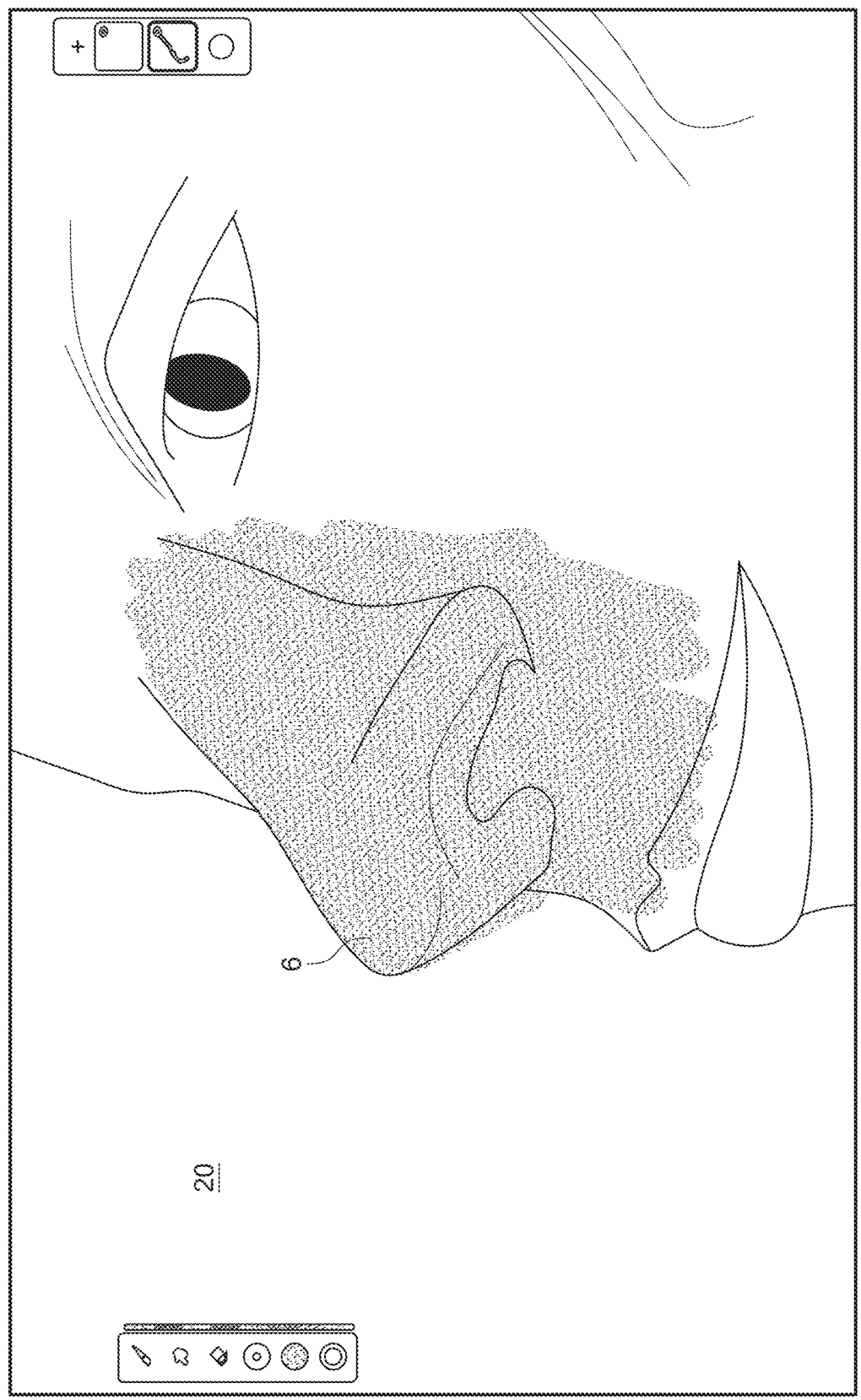
FIG. 3 is a schematic view of an exemplary embodiment of the subject disclosure, illustrating the application of the selected base color to the document 20.

Referring to FIG. 2, the base color may be input via a user by way of a base color picker 10, or the like, which may be separately or simultaneously represented by the user interface. The base color picker 10 may be presented adjacent the document 20. The base color picker 10 enables the user to select the base color from a plurality of base colors. The base color picker 10 also provide other sliders and user interface elements for the user to adjust the hue, saturation, and other attributes of any base color, as found in conventional color pickers. The base color selected from the base color picker 10, i.e., the selected base color 3, will be rendered and mapped onto the three-dimensional object 2.

The I3DO 2, or more particularly the surface thereof, is a three-dimensional representation of a range of relative luminosity of the base color. This allows the user to easily visualize the relative color properties of a selected base color as it extends of the three-dimensional surface of the I3DO 2, wherein the color properties of the base color vary based on the referential light sources and that particular location of the three-dimensional surface proximity to the one or more light sources. Thereby providing the user with a better sense of how a selected color relates to light sources, thereby facilitating color selection. Numerous configurations and variations of such techniques will be apparent considering this disclosure.

The user interface 100 associated with the I3DO 2 may provide an actual three-dimensional object or a flattened, artistic representation or realistic rendering of a three-dimensional object. One or more base colors may be used to color the I3DO 2. One or more light sources illuminating the colored object, which generates a plurality of colors between the base color and the shadow and lighting regions of the object, which can be selected from to use in the document (i.e. the selected color) without changing the base color or lighting environment of the object. The indicator 7 may be configured to show the selectable color 6 of the I3DO 2 where the indicator 7 is located. The selected color may also be separately represented in the user interface 100 by way of a selected color element 30.

Figure 4:
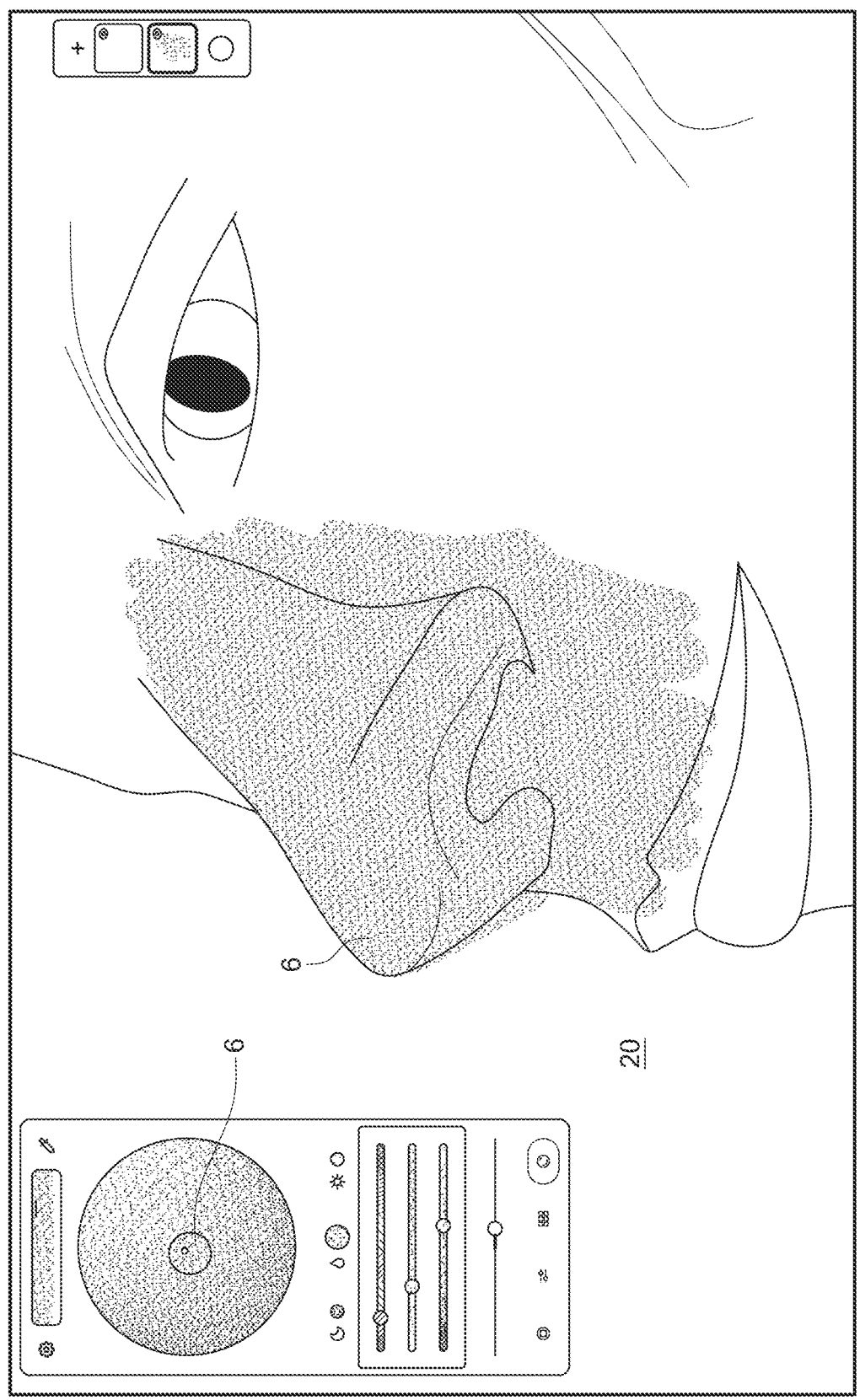
FIG. 4 is a schematic view of an exemplary embodiment of the subject disclosure, illustrating the user interface 100 represented within the document 20, whereby the user interface 100 providing a three-dimensional object 2 with a highlight for adding depth to the selected base color applied to the document, wherein the graphical indicator is shown in a first position along the three-dimensional object.
Figure 5:
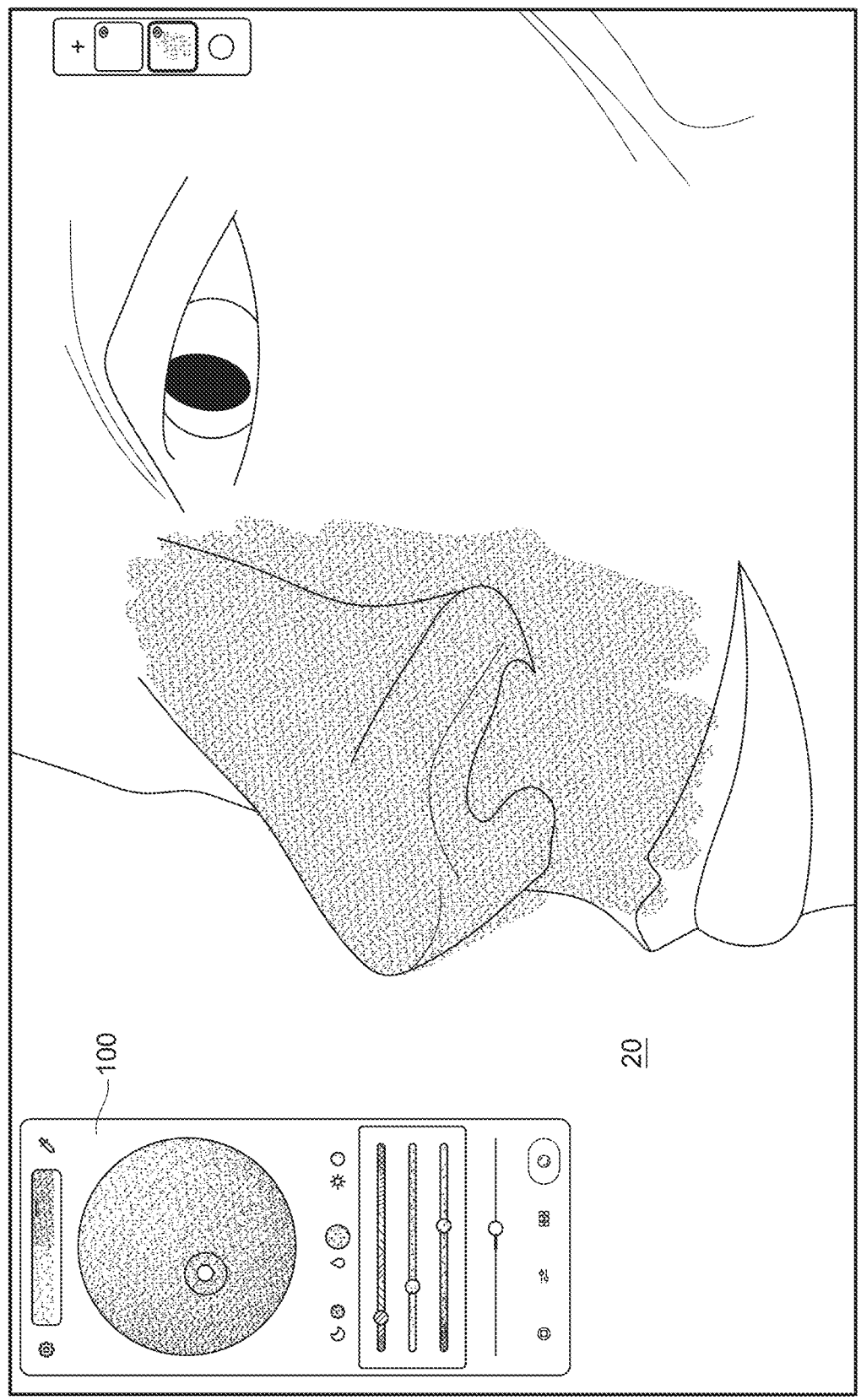
FIG. 5 is a schematic view of an exemplary embodiment of the subject disclosure, illustrating the indicator 7 moved to a second position along the three-dimensional object, away from the specular highlight and thus along a transitional path toward a shadow region of the selected base color, wherein the graphical indicator displays a modified base color corresponding to the second position along the curved surface of the three-dimensional object.
Figure 6:
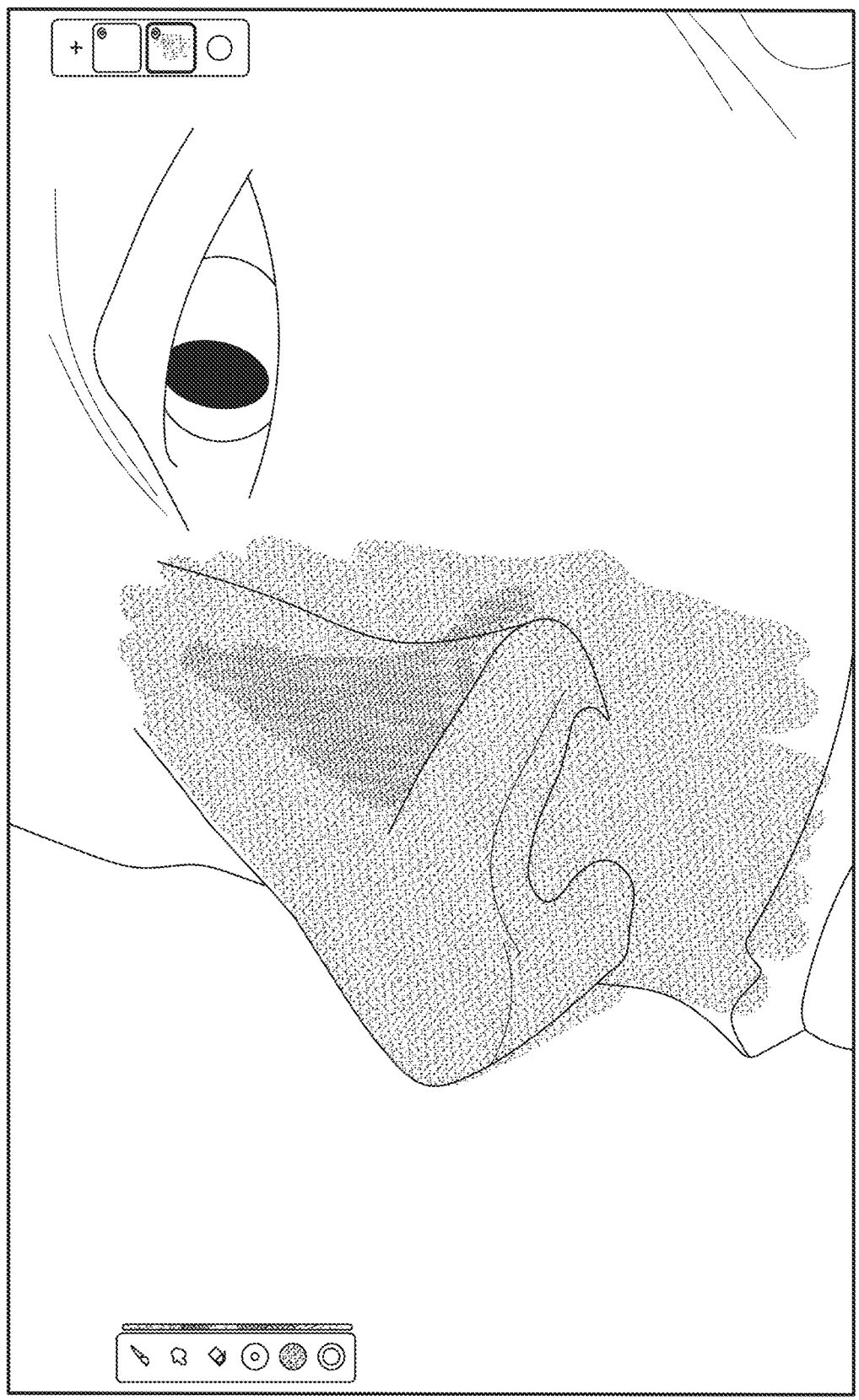
FIG. 6 is a schematic view of an exemplary embodiment of the present invention, illustrating the application of the modified second color.

The indicator 7 may be features as a disk-like "puck" user-interface element on the display, as shown in FIGS. 1, 4 and 5. A gesture-recognition system recognizes a gesture from a user (typically a user interface pointer device such as a cursor, tactile interactions, mouse pointer, though other recognizable gestures are contemplated herein) and accordingly moves the puck indicator 7. Thus, when the gesture/point moves in a first direction, the puck/indicator moves in a corresponding direction along the rendered three-dimensional object 2. The puck indicator 7 may be any size or shape, such as a circle, square, oval, or triangle.

The position of the puck indicator 7 may be used as an input or other variable to a computer program, display setting or any other such software application. In one embodiment, the x, y, z coordinates of the puck indicator 7 along the 3DO 2 controls a variables and/or color selection widget select a color mapped to said x, y, and z coordinate. The puck indicator 7 provides a representation of the selectable color 6 of the 3DO 2 mapped to the same location of that of the indicator 7. Pressing the top surface of the puck indicator 7, like a traditional button, causes an associated stylus (used for coloring document 20) to inherent that identified/selectable color 6, thereby the user can use the stylus to on an adjacent portion of the user interface.

In one embodiment, the indicator 7 is a "flat knob" on the user interface that transforms its peripheral shape as it moves along the three-dimensional object-becoming 'squashed' as it approaches the edges of the 3DO 2, while flattening as the flat knob/indicator 7 moves to the middle of the 3DO 2.

The I3DO 2 defines a three-dimensional surface or three-dimensional field of a selected base color 3, wherein the three-dimensional field provides one or more highlights 4. The highlight 4 may be represented as a bright spot of light giving the I3DO 2 a shiny appearance as if illuminated by the respective one or more light sources. In some embodiments, the highlight 4 may be a specular highlight from a specular light source. Also, "shininess" could be a controllable parameter.

The highlight 4 graphically provides a strong visual cue for the shape of the I3DO 2 as well as the location of the I3DO 2 with respect to light sources in a "scene" represented in the document. The light source is directional and reflects off the surface of a curve in the geometry of the I3DO 2. The light source is based on the angle between the viewer and the light source.

The ordinary meaning of the term specular light source means that light is perfectly reflected in a mirror-like way from the light source to the viewer. Specular reflection is visible only where the surface normal is oriented precisely halfway between the direction of incoming light and the direction of the viewer; this is called the half-angle direction because it bisects (divides into halves) the angle between the incoming light and the viewer. Thus, a reflecting surface would show a specular highlight as the perfectly sharp reflected image of a light source. However, many shiny objects show blurred specular highlights, which are reflected in the appended Figures.

The location of the highlight 4 can be selectively adjusted by a user to reflect or be representative of a light source associated with the scene they are attempting to represent in the document. The light sources may be adjusted in accordance with an angle between the point of view of the user and the light source.

The color selector is displayed to the user. When the color selector is first displayed, the base color and lighting environment is automatically generated for the three-dimensional object of the color selector by either a preset, a separate color selector control, or by automatic means such as by using the current selected color. Once the base color and lighting environment has already been defined, the system may detect if the current selected color exists on the current lighted object and decide whether to redefine the base color of the object in the color selector.

The user can change the selected color by tapping, clicking, or dragging along the surface of the three-dimensional object of the color selector. The selected color changes to match the color on the three-dimensional object in relation to the user interaction. The user can then leave the color selector and apply the selected color to the document. The user may leave and return to the color selector multiple times and expect the base color and lighting environment to remain consistent across uses as long as the user is working on the same base color region as shared between the document and the color selector or until the user manually changes the base color of the three-dimensional object used by the color selector. The term "leaving" the color selector may either mean closing it from a dialog or by keeping it open but focusing on a separate part of the UI (like painting on the canvas). It may remain open the whole time.

The user may also choose to change the three-dimensional object used by the color selector, change the base color, or change the lighting environment used to light the three-dimensional object used by the color selector.

Color selector object—the current implementation uses the I3DO 2 in the color selector. By way of example only, in drawing education material, a lighted orb is often used as a primitive demonstration of how a light source affects the appearance of an object. However, there are other three-dimensional forms that can be used instead of a smooth-surface sphere such as a planar sphere (like a dodecahedron or any polyhedron), a planar model of a head, or any other three-dimensional forms.

Storage—the current implementation changes the selected color while retaining the base color so that the selected color can be applied directly to the document by storing the RGB values of the color in the document where the user applies it. However, it may also be possible to store other information besides (or in addition to) the RGB values such as the UV coordinates of the reference object used in the color selector or the normalized value along the transitional path between the shadow and light source.

Light sources—the current implementation uses a single light source to illuminate the three-dimensional object used as the color selector. Alternate versions could use multiple light sources, different forms for lighting (direct/indirect/luminescent), different intensities, and different positions of the light source.

Object properties—the current implementation uses a smooth surface sphere that is colored with a single base color. It could be useful to use other three-dimensional properties on the object such as surface texture instead of using a smooth surface. This may help in more complicated situations when trying to render a lighted, textured region in a document. Also, it could be useful to use more than one base color to color the object. It may also be useful to use multiple base colors to color the three-dimensional object.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A color selection method for a document, the method comprising:
   rendering a three-dimensional object comprising:
   an illumination highlight indicating a light source of the three-dimensional object, wherein the three-dimensional object has an arc distance;
   a plurality of selectable colors of a base color arranged along a surface of the rendered three-dimensional object; and
   a selection indicator that is movable along the surface of the rendered three-dimensional object, wherein each location of the selection indicator along said surface modifies a selected color of the plurality of selectable colors of the base color as a function of both the illumination highlight and the arc distance.

2. The method of claim 1, wherein an orientation of the light source is selectable.

3. The method of claim 1, further comprising selecting an orientation of the light source.

4. The method of claim 3, wherein at least one shadow region and at least one light region are represented along the surface of the rendered three-dimensional object based on the orientation of the illumination highlight selected.

5. The method of claim 1, wherein the illumination highlight is a specular highlight indicating the light source.

6. The method of claim 1, wherein each selectable color is further defined based on a proximity between each said selectable color and a location of the illumination highlight along the surface of the rendered three-dimensional object.

7. The method of claim 1, further comprising selecting a second light source resulting in a second illumination highlight represented on the rendered three-dimensional object.

8. The method of claim 1, wherein the rendered three-dimensional object is spherical.

9. The method of claim 1, wherein the rendered three-dimensional object is a polyhedron.

10. The method of claim 1, further comprising:
    selecting an orientation of the light source resulting in at least one shadow region and at least one light region represented along the surface of the rendered three-dimensional object based on said orientation, wherein each selectable color is further defined based on a proximity between said each selectable color and a location of the at least one light region along the surface of the rendered three-dimensional object; and
    selecting a second light source resulting in a second illumination highlight represented on the rendered three-dimensional object.

* * * * *